United States Patent Office 3,227,724
Patented Jan. 4, 1966

3,227,724
PROCESS FOR PREPARING 2-METHYL-3-HYDROXYPYRIDINES
Karl Pfister III and Elbert Harris, Westfield, and Raymond A. Firestone, Fanwood, N.J., assignors to Merck & Co., Inc., Rahway, N.J., a corporation of New Jersey
No Drawing. Original application Jan. 16, 1962, Ser. No. 166,688. Divided and this application June 16, 1964, Ser. No. 375,668
2 Claims. (Cl. 260—297)

This invention relates to a method of making pyridine compounds. More particularly, it is concerned with a process for preparing 2-methyl-3-hydroxypyridines.

This application is a division of Serial No. 166,688, filed January 16, 1962, which, in turn, is a continuation-in-part of Serial No. 109,853, filed May 15, 1961, and now abandoned.

The 2-methyl-3-hydroxypyridines are valuable intermediates which are useful in the synthesis of compounds such as vitamin $B_6$ and its derivatives. The methods presently available for the preparation of vitamin $B_6$ and intermediates useful in its preparation involve multi-step procedures which are difficult to carry out on a commercial scale.

It is an object of the present invention to provide an improved procedure for the preparation of 2-methyl-3-hydroxypyridines. A further object is to provide methods for the production of 2-methyl-3-hydroxypyridines having substituents at positions 4 and 5 which are readily converted to hydroxymethyl substituents. A further object is to provide a convenient method for the production of vitamin $B_6$. Other objects will be apparent from the detailed description of this invention hereinafter provided.

In accordance with the present invention, it is now found that 2-methyl-3-hydroxypyridines can be readily and conveniently produced by reacting 4-methyl-5-hydrocarbonoxyoxazoles with an ethylenic compound. This reaction is particularly suitable for the preparation of 4,5-disubstituted derivatives of 2-methyl-3-hydroxypyridine by reacting 1,2-disubstituted ethylenic compounds with the oxazole. The reaction for the preparation of such substituted derivatives can be illustrated structurally as follows:

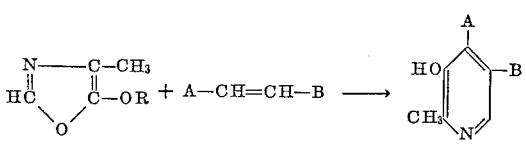

Thus, in accordance with the foregoing flow sheet, the oxazole is reacted with the ethylenic compound to produce the corresponding 4,5-disubstituted 2-methyl-3-hydroxypyridine.

In the foregoing described reactions, the substituent R of the oxazole moiety represents a hydrocarbon group. The process of this invention can be carried out with various 4-methyl-5-hydrocarbonoxyoxazoles, although generally it is preferred to use the oxazoles having a hydrocarbon group containing from one to ten carbon atoms since such compounds are most readily prepared and under optimum conditions produce high yields of the desired 2-methyl-3-hydroxypyridine compounds. Thus, oxazoles wherein the hydrocarbon substituent is a lower alkyl group of from one to ten carbon atoms, such as methyl, ethyl, isopropyl, butyl, isobutyl, amyl and octyl, a heterocyclic alkyl such as tetrahydrofurfuryl, an aralkyl group such as the benzyl, phenylethyl and phenylpropyl, or an aryl group such as phenyl, cresyl and the like, represent preferred oxazoles which can be used in the process of the present invention.

The ethylenic compounds reacted with the oxazole to produce the desired pyridine compounds can be those wherein A and B of the formula above represent a carbon substituted group such as COOH, CHO, $CONH_2$, COOR, COX, $CH_2OR_1$, CN, $CH_2X$, $CH_2NH_2$, $CH_2OH$ and $CH_2NHR_1$ wherein $R_1$ represents a hydrocarbon substituent, preferably one containing from one to ten carbon atoms, and X represents a halogen. Alternatively, A and B together can be linked in a heterocyclic ring by oxygen, sulfur or nitrogen.

Thus, pursuant to one embodiment of this invention, an ethylenic compound such as maleic or fumaric acid or a derivative thereof such as an ester or anhydride is reacted with the oxazole to produce the corresponding 4,5-disubstituted 2-methyl-3-hydroxypyridine. For example, when maleic anhydride, maleic acid or fumaric acid is reacted with the oxazole, 2-methyl-3-hydroxy-4,5-dicarboxypyridine is obtained. This product can be converted to vitamin $B_6$ in accordance with methods known in this art. Alternatively, when the oxazole is reacted with a mono- or diester of maleic or fumaric acid, the corresponding ester of 4,5-dicarboxy-2-methyl-3-hydroxypyridine is obtained which likewise can be converted to vitamin $B_6$ by procedures known in the art. Similarly, other derivatives of fumaric acid or maleic acid such as fumaronitrile or fumaryl chloride, maleonitrile and the like are similarly reacted with the oxazole to produce the corresponding 2-methyl-3-hydroxypyridine having substituents at positions 4 and 5 which are also useful as intermediates in the preparation of vitamin $B_6$ and related pyridine compounds.

In accordance with a further specific embodiment of this invention, it is found that the furan compound, 2,5-dihydrofuran can be similarly reacted with the 4-methyl-5-hydrocarbonoxyazole to produce the inner ether of vitamin $B_6$. This compound can then be converted to vitamin $B_6$ by known procedures.

Pursuant to a still further embodiment of this invention, butenediol can be reacted with the 4-methyl-5-hydrocarbonoxyoxazole to produce vitamin $B_6$ directly.

The reaction between the oxazole and the ethylenic compound is effected by intimately contacting a mixture of the reactants for sufficient time to complete the reaction. The reaction of the ethylenic compound and the oxazole can be completed by permitting the reactants to stand at room temperature or the reaction mixture is conveniently warmed to a temperature up to about 200° C. to accelerate and complete the formation of the desired pyridine compound. Generally, when the reaction is carried out with an active dienophile such as maleic anhydride, it can be carried out at room temperature. When less active, dienophiles such as dihydrofuran, butenediol, and the like are used, the reaction will not go at a significant rate unless it is heated to 150–200° C. The formation of the substituted pyridine can be carried out in the presence of a suitable solvent for the reactants such as methanol, benzene and the like, although the presence of such a solvent is not essential in carrying out the process of this invention.

In preparing the 2-methyl-3-hydroxypyridine compounds in accordance with the present invention, the initial product formed by the reaction of the oxazole and some ethylenic compounds under certain conditions is apparently an adduct which can be represented by the formula

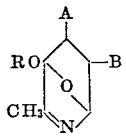

wherein R, A and B are the same as defined above. This adduct appears to be formed as a reaction product when certain ethylenic compounds, such as maleic anhydride, are reacted with the oxazole at low temperatures and is cleaved to form the desired 2-methyl-3-hydroxypyridines when the reaction product is treated with acid. When the condensation of the ethylenic compound with the oxazole is carried out at elevated temperatures, 100° C. or above, the adduct appears to be thermally cleaved under the reaction conditions.

It should, of course, be understood that this explanation of the course of the reaction involving the intermediate adducts is based on our present knowledge of the reaction and does not exclude the possibility that subsequent experimental data will establish that the postulated structure of the adduct is, in face, incorrect. Accordingly, we do not wish to be bound by these theoretical considerations however likely they may appear to be in the light of our resent knowledge. These explanations are presented principally as a means of providing a better understanding of our invention.

The following examples illustrate various methods of producing 2-methyl-3-hydroxypyridines by the procedures of the present invention.

*Example 1*

Upon mixing 1.27 g. of 4-methyl-5-ethoxyoxazole (0.01 mole), 0.98 g. of maleic anhydride (0.01 mole) and 2.5 ml. of dry benzene, a yellow color appears and heat is evolved, requiring cooling. After 3–4 minutes the evolution of heat ceases and the color fades. The mixture is then refluxed for about 18 hours, after which the solvent is decanted and the residue treated with a small quantity of water. The resulting mixture is dried by adding ethanol and benzene and drying the resulting mixture by azeotropic distillation. To the residue is added 40 ml. of ethanol and the solution is then saturated with gaseous HCl. The acidic solution is refluxed for 3½ hours. After cooling the solvent is evaporated and the partially crystalline residue containing diethyl 2-methyl-3-hydroxypyridine-4,5-dicarboxylate hydrochloride is converted to the free base by reaction with aqueous sodium bicarbonate. The resulting solution is extracted with ether and the ether extracts dried over magnesium sulfate.

The ether solution containing diethyl 2-methyl-3-hydroxypyridine-4,5-dicarboxylate is treated with 0.5 g. of lithium aluminum hydride resulting in a vigorous reaction. The resulting mixture is stirred for two hours and allowed to stand overnight. The excess hydride is then decomposed by the addition of ethanol and then water. The ether layer is removed and the aqueous layer is saturated with carbon dioxide. After filtering the solution is evaporated to dryness. The resulting residue is extracted three times with hot ethanol and gaseous HCl is passed into the ethanol extracts. After allowing the acidified ethanol solution to stand for 2–3 hours, crystals of vitamin $B_6$ HCl are deposited and recovered by filtration. The infrared and ultraviolet spectrums as well as the melting point are identical with those of authentic vitamin $B_6$ HCl.

*Example 2*

A mixture of 1.27 g. of 4-methyl-5-ethoxyoxazole (0.01 mole), 0.98 g. of maleic anhydride (0.01 mole), and 2.5 ml. of dry benzene is allowed to react, keeping the temperature below about 30° C. until the reaction is complete in about twenty minutes. The resulting reaction mixture contains the adduct which is hygroscopic. The infrared spectrum, the low volatility and the lack of U.V. absorption above 220 m$\mu$ show that neither starting material is significantly present. To the resulting reaction mixture containing the adduct is added 35 ml. of ethanol. This solution is saturated with gaseous dry HCl, and the acidified solution is then refluxed for about 15½ hours. After cooling the solvent is removed by evaporation and the residue is neutralized by the addition of aqueous sodium bicarbonate solution. The resulting solution is extracted three times with ethyl ether. The aqueous portion is acidified with HCl to Congo red. Upon standing crystals of a monoethyl ester of 2-methyl-3-hydroxypyridine-4,5-dicarboxylic acid are deposited and recovered by filtration. M.P. 252° C. (dec.).

The ether extracts after drying over magnesium sulfate are filtered and evaporated to afford a partially crystalline residue. The crystalline portion separated by filtration is ethyl 2-methyl-3-hydroxypyridine-5-carboxylate.

The oily residue obtained after removal of the crystalline portion is distilled at 0.15 mm. pressure at 105–120° C. to yield the diethyl ester of 2-methyl-3-hydroxy-4,5-dicarboxypyridine. This product is converted to the hydrochloride by dissolving it in a mixture of ethyl ether and ethanol and passing in gaseous HCl. The product after recrystallization from ethanol-ethyl ether melts at 140–144° C. Upon mild hydrolysis with dilute aqueous sodium hydroxide for 5 minutes followed by acidification, a monoethyl ester of 2-methyl-3-hydroxy-4,5-carboxypyridine different from that recovered as described above crystallizes out, M.P. 203–205° C. (dec.).

When the diethyl ester hydrochloride is heated with aqueous sodium hydroxide for 15 minutes on the steam bath, and the resulting reaction mixture is cooled and acidified to Congo red, the dicarboxylic acid, 2-methyl-3-hydroxy-4,5-dicarboxypyridine crystallizes out and can be recovered by filtration.

Treatment of the diethyl ester hydrochloride with lithium aluminum hydride as described in the art produces vitamin $B_6$ hydrochloride, M.P. 203.5–205° C. (dec.).

*Example 3*

A mixture of 1.27 g. (0.01 mole) of 4-methyl-5-ethoxyoxazole and 3.5 g. (0.02 mole) of diethyl maleate is heated at 50–60° C. for 2 hours. After cooling to 0° C., 10 ml. of ethanol and 2 ml. of 9 M ethanolic HCl is added and the solvents removed under reduced pressure. The resulting residue containing the diethyl ester of 2-methyl-3-hydroxy-4,5-dicarboxypyridine is slurried with 25 ml. of ether and filtered; the filter cake being washed with 2 x 10 ml. of ether. The diethyl ester of 2-methyl-3-hydroxy-4,5-dicarboxypyridine hydrochloride so obtained melted at 132–138° C.

*Example 4*

When diethyl fumarate is reacted with 4-methyl-5-ethoxyoxazole by the procedures described in Example 3, the diethyl ester of 2-methyl-3-hydroxy-4,5-dicarboxypyridine HCl is produced.

*Example 5*

A small portion of a mixture of 0.254 g. of 4-methyl-5-ethoxyoxazole, 2.804 g. of 2,5-dihydrofuran and 0.01 g. of hydroquinone is heated in a sealed glass tube at 150° C. for 6 hours. After cooling the tube is opened and the contents rinsed out with a small amount of ethanol. A portion of this solution is spotted on a paper strip and chromatographed 15 minutes in chloroform:formamide; chloroform being the mobile phase and formamide the stationary phase. The paper gram is dried at 90° C. under reduced pressure and the U.V. absorbing spot is eluted with 4.00 ml. of 0.1 N HCl. The U.V. spectrum of the resulting solution corresponds exactly with that of the inner ether of vitamin $B_6$. Alternatively, the product can be isolated by cooling the reaction tube and recovering the precipitated product by filtration.

Example 6

To 0.88 g. (.01 mole) of 2-butene-1,4-diol is added 1.27 g. (.01 mole) of 4-methyl-5-ethoxyoxazole, and the resulting reaction mixture allowed to stand at room temperature for 15 hours. The reaction mixture is heated in a nitrogen atomsphere to 199° C. and then allowed to cool. The infrared spectrum of a sample of the reaction mixture indicates that the 6.01μ oxazole band is diminishing. At this point 20 cc. of ethanol is added to the mixture and the resulting solution is saturated with gaseous HCl. After refluxing the solution for 15 minutes, the ethanol is evaporated. A small amount of ethanol is added and then evaporated off to remove excess HCl. After repeating this procedure again, the residue is dissolved in 5 ml. of water and a portion of the solution subjected to paper chromatography for the detection and separation of vitamin $B_6$ in the system n-butanol vs. pH 7 aqueous phosphate. The portion of the paper chromatogram corresponding to the vitamin $B_6$ control spot is eluted with water. The ultraviolet spectrum of the resulting aqueous solution in both acidic and basic solution corresponds to that known for vitamin $B_6$.

Example 7

A mixture of 1.27 g. (.01 mole) of 4-methyl-5-ethoxyoxazole, 0.97 g. (.011 mole) of 2-butene-1,4-diol and a trace (<1 mg.) of hydroquinone is heated and maintained at about 200° C. for 2 hours in a nitrogen atmosphere. The resulting reaction mixture is worked up following the procedure of Example 6. The aqueous solution is found to contain vitamin $B_6$ as determined by bioassay.

Example 8

A mixture of 1.27 g. (.01 mole) of 4-methyl-5-ethoxyoxazole, 0.97 g. (.011 mole) of 2-butene-1,4-diol, a trace (<1 mg.) of hydroquinone and 58 ml. of 1,2-dimethoxyethane is heated at 100° C. under a pressure of 145,000 p.s.i. for about three days. The resulting reaction mixture is filtered and evaporated. The infrared spectrum of the residue indicates a marked decrease of the 6.01μ oxazole band. The residue is then dissolved in 15 ml. of 0.1 N HCl and the resulting solution heated on the steam bath for 30 minutes. The solution is then adjusted to pH 7.5 with sodium carbonate and a portion of the solution subjected to paper chromatography following the procedure described in Example 6. Elution of the spot corresponding to the vitamin $B_6$ control with .1 N HCl solution yields a solution containing vitamin $B_6$ as determined by the U.V. spectrum and confirmed by bioassay.

Example 9

1.016 gm. of 4-methyl-5-ethoxyoxazole (0.008 mole) and 11.216 gm. of 2,5-dihydrofuran (0.016 mole) are charged into a 22 ml. Paar peroxide bomb and heated at 175° C. for three hours. After cooling, the bomb is opened and the crystalline inner ether of vitamin $B_6$ present is recovered by filtration. The filtered product is washed with 5 ml. of cold 2,5-dihydrofuran and dried in a vacuum oven at 80° C.

Example 10

41.0 gm. of fumaronitrile (0.53 mole) and 52.5 ml. of anhydrous methanol are charged into a 500 ml., four-necked round-bottom flask, equipped with a thermometer, reflux condenser, dropping funnel, and agitator. To the stirring methanolicnitrile slurry is added 66.8 gm. of 4-methyl-5-ethoxyoxazole (0.53 mole) from the dropping funnel. The reaction mixture is heated to reflux and held at this temperature for 45 minutes. 131.3 ml. cold anhydrous methanol is added and the mixture is cooled in an ice bath with stirring to 3° C. To this mixture is added 21.0 ml. of concentrated HCl through the dropping funnel at such a rate that the temperature of the reaction mixture does not rise above 20° C. The light yellow precipitate which forms upon cooling is aged for 1 hour. The precipitate is filtered and the slurry washed with 1 x 50 ml. cold anhydrous methanol. The precipitate is dried in a cold vacuum oven. The product so obtained contained 83.1% of 2-methyl-3-hydroxy-4,5-dicyanopyridine hydrochloride according to the U.V. assay.

Example 11

An aliquot of a mixture of 0.127 g. 4-methyl-5-ethoxyoxazole, 3.44 g. of 1,4-diacetoxybutene-2, and a trace of hydroquinone are sealed in a glass capillary tube and heated in an oil bath at 175° C. for 1½ hours. The tube is cooled and broken open, and the contents dissolved out with 95% ethanol. The solvent is stripped off and the residue taken up in water, made alkaline with sodium carbonate to pH 11, and heated on the steam bath for 30 minutes to hydrolyze the ester groups. The cooled solution is then neutralized with concentrated hydrochloric acid. A measured aliquot is spotted on filter paper and chromatographed in the system n-butanol vs. pH 7 aqueous phosphate as described in Example 6. The portion of the chromatogram corresponding to the vitamin $B_6$ control spot is eluted with 0.1 N HCl. The ultraviolet spectrum of this solution corresponded exactly to that known for vitamin $B_6$.

Example 12

A mixture of 0.25 g. 1,4-dimethoxybutene-2, 0.72 g. of 4-methyl-5-ethoxyoxazole and a trace of hydroquinone is heated at 100° C. for 120 hours. Unreacted starting materials are distilled off at 30 mm. Hg vacuum to a temperature of 60° C. The residue is taken up in 20 ml. of methanol, treated with anhydrous hydrogen chloride gas, warmed briefly, cooled, and stripped of solvent in vacuo. The residue is recrystallized from isopropyl alcohol to yield 2-methyl-3-hydroxy-4,5-dimethoxymethyl pyridine hydrochloride, identical by I.R. absorption and $R_f$ on paper strip chromatography with an authentic sample prepared by an unequivocal route, M.P. 144–145° C.

Example 13

A mixture of 0.127 g. of 4-methyl-5-ethoxyoxazole, 0.128 g. of γ-acetoxycrotonaldehyde, and a trace of hydroquinone is held at room temperature for 18 hours. The mixture is taken up in ethanol, made basic with 5 ml. of 3% ethanolic sodium ethoxide, and refluxed for two hours. The solution is cooled, neutralized with concentrated hydrochloriic acid, and stripped of solvents in vacuo. A sample of the residue gives the same $R_f$ on paper strip chromatography and the same U.V. absorption spectrum as an authentic sample of pyridoxal hydrochloride (2-methyl-3-hydroxy-4-formyl-5-hydroxymethyl-pyridine hydrochloride). The remainder of the residue is reduced with lithium aluminum hydride in ethylene glycol dimethyl ether to vitamin $B_6$ hydrochloride (as indicated by paper strip $R_f$ and U.V. absorption).

Example 14

An aliquot of a mixture of 2.80 g. of 2,5-dihydrofuran, 0.23 g. of 4-methyl-5-methoxyoxazole and a trace of hydroquinone is sealed in a glass capillary tube and heated in an oil bath at 175° C. for two hours. The tube is cooled, the contents dissolved out with 95% ethanol and an aliquot of this solution spotted on filter paper and chromatographed in the system chloroform-formamide. The fluorescent band (U.V. light) with the same $R_f$ as the inner ether of vitamin $B_6$ is eluted with 0.1 N HCl and showed the same U.V. absorption spectrum as an authentic sample.

Example 15

An aliquot of a mixture of 0.28 g. of 4-methyl-5-isopropoxyoxazole, 2.80 g. of 2,5-dihydrofuran, a trace of hydroquinone, and 0.10 g. of trichloracetic acid is sealed in a glass capillary tube and heated in an oil bath at 175° C. for two hours. The tube is cooled, the contents dissolved out with 95% ethanol, and an aliquot of this solution spotted on filter paper and chromatographed in the system chloroform-formamide. The fluorescent (in U.V. light) band with the same $R_f$ as the inner ether of vitamin $B_6$ is eluted with 0.1 N HCl and showed the same U.V. absorption spectrum as an authentic sample.

The oxazole compounds used as starting materials in the foregoing examples can be prepared in accordance with procedures described and claimed in copending application Serial No. 109,852, filed May 15, 1961, by formylating the appropriate α-alaninate ester acid salt and reacting the resulting formyl derivative with phosphorous pentoxide to produce the corresponding 4-methyl-5-hydrocarbonoxyoxazole. Thus, the ethoxy oxazole can be prepared as follows:

To 35 g. of ethyl α-alaninate hydrochloride is added 10 g. of formamide and the resulting mixture is heated slowly to 105° C. over a period of 30 to 45 minutes. After heating at 105° C. for ten minutes, about 75 ml. of toluene is added. After standing for about one hour, the mixture is then refluxed for about six hours. After cooling the ammonium chloride formed is removed and the resulting solution is evaporated to remove the solvent. The ethyl N-formyl-α-alaninate is obtained by distillation at 100° C. at 0.9 mm. pressure.

To a mixture of 25 ml. of alcohol free chloroform and 11.36 g. of $P_2O_5$ is added over 20 minutes a solution of 5.81 g. of ethyl N-formyl-α-alaninate in 15 ml. of alcohol free chloroform at about 30° C. The resulting reaction mixture is refluxed for one hour, cooled and the solvent decanted. The hard mass remaining is broken up and a solution of 27 g. of potassium hydroxide in 27 ml. of water and 34 ml. of methanol is gradually added keeping the temperature at 10–20° C. The resulting solution is refluxed for one hour, cooled and extracted with 10 x 15 ml. of methylene chloride. The 4-methyl-5-ethoxy oxazole is recovered, after removing the solvent, by distilling at 75–80° C. at 10 mm. pressure.

In the same way other oxazoles are prepared by starting with the appropriate alaninate ester.

Various changes and modifications of the invention can be made and, to the extent that such variations incorporate the spirit of this invention, they are intended to be included within the scope of the appended claims.

What is claimed is:

1. A process for preparing a compound of the formula

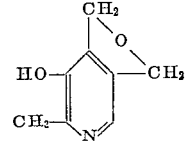

which comprises reacting an oxazole of the formula

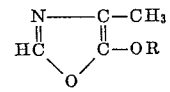

wherein R is a member from the group consisting of alkyl having from one to ten carbon atoms, tetrahydrofurfuryl, benzyl, phenylethyl, phenylpropyl, phenyl and cresyl with 2,5-dihydrofuran.

2. A process for preparing a compound of the formula

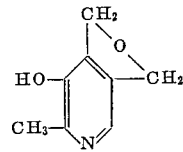

which comprises reacting 4-methyl-5-ethoxyoxazole with 2,5-dihydrofuran.

No references cited.

WALTER A. MODANCE, *Primary Examiner.*

JOHN D. RANDOLPH, R. T. BOND,

*Assistant Examiners.*